March 21, 1950      R. BARTLEMAN      2,501,202
CABLE TESTING LEAD RACK
Filed Jan. 23, 1948
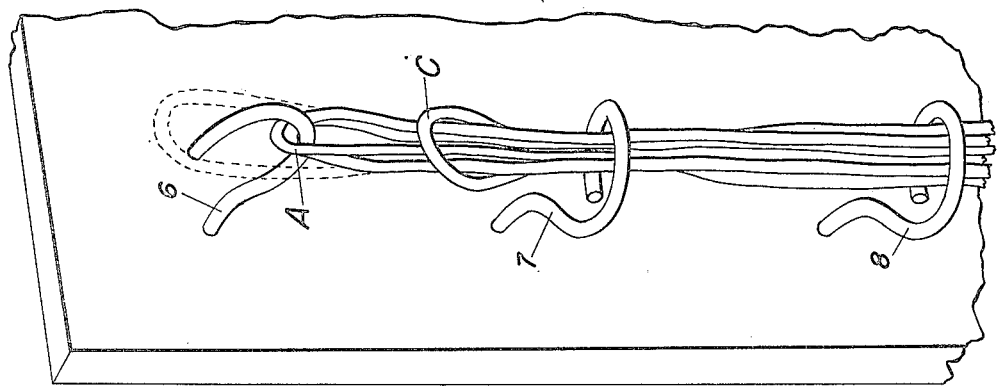
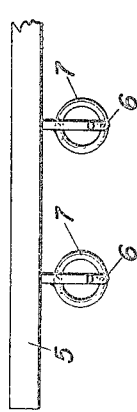
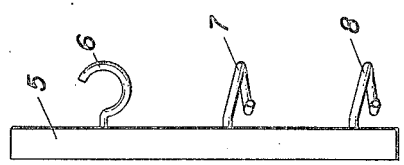
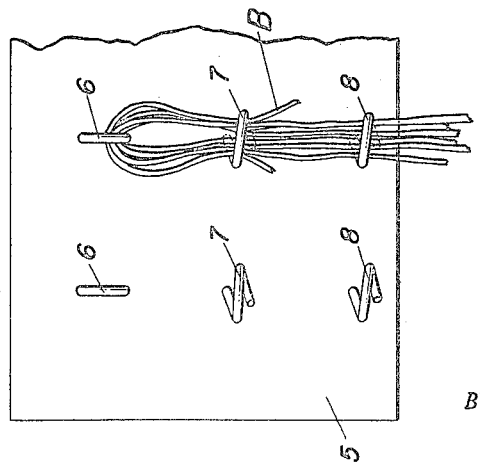
INVENTOR.
Richard Bartleman
BY
Att'y Patented Mar. 21, 1950

2,501,202

UNITED STATES PATENT OFFICE 2,501,202

CABLE TESTING LEAD RACK

Richard Bartleman, San Francisco, Calif.

Application January 23, 1948, Serial No. 3,942

1 Claim. (Cl. 211—87)

This invention relates to improvements in cable testing lead racks.

The principal object of this invention is to provide a rack upon which a number of individual testing leads may be hung in such a manner that any one of the leads may be individually removed from the rack, no matter how deeply covered by other leads, quickly and without the danger of the lead becoming tangled with any of the other leads, thus saving a great deal of time in the securing of a testing lead.

A further object is to provide a device of a character which is economical to manufacture, one which occupies a minimum amount of space, and one which saves untold hours of untangling leads carelessly placed in a box or bin.

A further object is to produce a device wherein the various cable lead ends may be quickly seen so that the user may select a testing lead having the proper ends thereon to suit the work being done.

Other objects and advantages will be apparent during the course of the following description.

In the accompanying drawings forming a part of this specification and in which like numerals are employed to designate like parts throughout the same, Fig. 1 is a top-plan view of a portion of my rack;

Fig. 2 is a front elevation of a portion of my rack;

Fig. 3 is an end elevation of Fig. 2, looking from the left of the drawings, and Fig. 4 is a fragmentary prospective view of a portion of the rack, showing the leads thereon, with one of the leads being withdrawn.

In electrical work it is common to use what are termed, testing leads. These leads are employed for the purpose of making temporary connections between different apparatus, portions thereof, or to quickly switch connections from one portion of an apparatus to another.

Many pieces of apparatus have differently-shaped terminals, sockets, plugs, jacks and the like, each one of which requires a definite type of connector in order to complete a circuit to the particular terminal to be used. As an example, a lead may connect to a jack-type terminal and then to a binding-post terminal. Therefore, the lead must have two different types of ends. Another lead may use pincher-type connectors on each end of the terminal.

It is, therefore, apparent that there are literally hundreds of various combinations of testing leads used in a large laboratory.

It has been customary to keep these leads in a box or bin with the result that, as the users hunt around through the loose leads, they become tangled and, at the same time, it is hard to determine what type of connector is secured to each end of the lead. For instance, a person could find a lead with the right type of connector at one end and then, after untangling the lead from the others in the box or bin, would find that the lead selected would not have the proper connector. Applicant's rack eliminates this difficulty entirely.

In the accompanying drawings, wherein, for the purpose of illustration, is shown a preferred embodiment of my invention, the numeral 5 designates a supporting board upon which is mounted adjacent the upper portion of the board, one or more screw-eyes, as shown at 6.

Positioned within the board and mounted directly below each of the screw-eyes 6, is a horizontally-disposed open hook 7, and spaced therebelow is a similar open hook 8, also horizontally positioned. The result of this construction is that, when it is desired to hang a testing lead on the rack, the lead is doubled upon itself so that the ends having the connectors secured thereto are in close proximity to each other.

The looped lead is now engaged over one of the hooks 6, as shown at A in Fig. 4, and the downwardly-extending portions of the lead are brought into engagement and moved into the looping of the open hooks 7 and 8.

We will now assume that quite a large number of leads have been mounted upon one of the hooks 6, as shown at Figs. 2 and 4 (and it will here be noted that short leads, as shown at B, may equally well be mounted on the rack) and that it is desired to release one of the leads. The lead is selected and raised to the dotted-line position of Fig. 4, so as to release the loop from the hook 6, after which, by pulling downwardly on the ends of the lead, the loop C, will travel downwardly through the hooks 7 and 8, sliding along the other leads supported upon the particular hook from which this lead has just been released.

Thus it is possible to quickly select and remove a testing lead with the assurance that the right type of terminals are on the end of the lead, and with the assurance that the lead will not become entangled with many other leads, as above described.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A cable testing lead rack comprising a support having a hook positioned adjacent its upper portion, a plurality of open-looped hooks mounted beneath said first-mentioned hook, said first-mentioned hook having its supporting loop vertically disposed, the other of said open-looped hooks being horizontally disposed and in vertical alignment with said first hook, whereby a looped lead may be supported on the first of said hooks, and have its ends surrounded by said open-looped hooks.

RICHARD BARTLEMAN.

REFERENCES CITED

The following references are of record in the file of this patent:

UNITED STATES PATENTS

| Number | Name | Date |
| --- | --- | --- |
| 1,282,216 | Goldberg | Oct. 22, 1918 |
| 1,380,747 | Stanford et al. | June 7, 1921 |
| 1,394,947 | Singer | Oct. 25, 1921 |
| 1,691,412 | Ruetz | Nov. 13, 1928 |
| 1,720,746 | Povlsen et al. | July 16, 1929 |